March 4, 1969  W. CALFEE  3,431,467
MINIATURE PHASE SEQUENCE SENSING CIRCUIT
Filed Nov. 23, 1966

WITNESSES
Bernard R. Giagney
E. Strickland

INVENTOR
Wendell Calfee
BY F. V. Lyle
ATTORNEY

3,431,467
MINIATURE PHASE SEQUENCE SENSING CIRCUIT
Wendell Calfee, Lima, Ohio, assignor to Westinghouse Electric Corporation, Pittsburgh, Pa., a corporation of Pennsylvania
Filed Nov. 23, 1966, Ser. No. 596,500
U.S. Cl. 317—47                                6 Claims
Int. Cl. H02h 3/26

---

ABSTRACT OF THE DISCLOSURE

A phase sequence responsive control device in which one phase is connected to the anode and another phase to the gate of a controlled rectifier such that when the phases are in proper sequence the conducting time of the controlled rectifier will suffice to charge the capacitor connected to the cathode of the controlled rectifier to the voltage magnitude necessary to turn on a transistor switching device which is employed to actuate a mechanical relay. The aforementioned capacitor will not be charged to the required voltage magnitude when the phases are out of sequence.

---

The present invention relates to phase sequence responsive control devices and particularly to phase sequence sensing circuit arrangements which are especially susceptible to solid state miniaturization and which have many other inherent advantages to be fully explained hereinafter.

Phase sensing circuits are often used in electrical systems to provide operating protection for system components. Such circuits are particularly useful in aircraft and aerospace vehicles where three phase, 400 c.p.s. voltages are commonly employed. While the present invention is not restricted in its usefulness to a particular application, it is especially suitable for sensing the phase sequence of aircraft generator output and in other similar applications where weight, size and power dissipation must be kept to a minimum and where a high degree of accuracy and reliability are required.

Heretofore, phase sequence detection schemes have generally employed circuit arrangements which essentially add phase voltage vectors by the use of RC networks. A correct phase sequence will have a different voltage magnitude than an incorrect sequence. To obtain adequate voltage sensing levels the RC components are large in size and critical in tolerance.

Thus, these larger, more precisely calibrated components do not lend themselves for use in miniature control devices because their size, weight, cost and power dissipation are out of proportion to the function they perform in comparison to other circuit functions performed by miniature, solid state elements. The phase voltage vector addition arrangement further does not consistently give an incorrect sequence indication when a shorted phase occurs. It will also show a correct phase sequence with open phases.

The present invention is directed to providing a new phase sequence responsive circuit capable of using rugged micro-miniature, solid state (static) circuit components designed to integrate the area under an alternating current voltage curve instead of adding voltage vectors. By so doing, proper sequence is accurately determined by producing an output signal only when sequence is correct and when all phases are present.

In accordance with the broad principles of the present invention, two half-wave rectifiers are connected to two phase lines of a polyphase power system. The half-wave rectifiers produce a positive unidirectional voltage signal. When phase A rectifier produces a positive signal it provides a gate signal to a controlled rectifier connected to the output of the phase B rectifier. If the sequence is correct (A first, then B), the controlled rectifier will start conducting as soon as the phase B voltage, applied to the anode thereof, becomes positive since a gate signal (from phase A) has been present for 120 electrical degrees. Once the controlled rectifier starts conducting it remains conducting until the anode current is removed which occurs 180 degrees later when phase B voltage goes negative. In other words the controlled rectifier continues to conduct after the gate signal is removed. A capacitor, connected to the cathode of the controlled rectifier, charges during the conducting cycle of the rectifier, the magnitude of the voltage across the capacitor being proportional to the conducting angle. If, however, the phases became reversed (B before A, for example), the controlled rectifier would not start conducting as soon as its anode becomes positive because no gate signal would be applied. It would, instead, conduct 120 degrees later when it receives its first gate signal from the phase B line. The capacitor then, would only charge for the remaining time period that phase A voltage is positive, which would be only 60 degrees, even though the controlled rectifier would have a gate signal during the full positive half cycle (180 degrees) of phase B; as explained above, the gate only makes it possible for a controlled rectifier to conduct after anode voltage is present; thereafter, it does not need the gate. Thus, the capacitor attains an insufficient charge for out-of sequence phase voltages.

If the capacitor charge is used to turn on say a transistor switching device employed to actuate a mechanical relay or a solid state flip-flop block, no switching signal is developed with out-of-phase voltages, and therefore no relay actuation is accomplished that may be used to connect a generator output to say a load bus. With proper phase sequence sensed, the unique circuit described above may be used to cause relay or flip-flop actuation and generator circuit breaker closure.

It is therefore an object of the present invention to provide a novel, miniature phase sequence sensing circuit which accurately integrates the area contained under a voltage curve.

Another object of the invention is to provide a unique phase sequence sensing circuit that is economical to manufacture and operate.

Yet another object of the invention is to provide a rugged and flexible phase sequence sensing circuit which can operate a relay or work compatibility with logic functions at different frequencies.

A further object of the invention is to provide a reliable phase sequence sensing circuit which will not operate until all phases are present and which may be modified to remain energized if one or all phase lines are disconnected or shorted to ground.

These and other objects of the invention will become more apparent upon consideration of the following detailed description along with the accompanying drawing in which.

Figure 1:
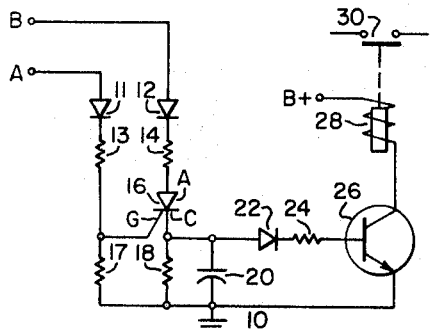
FIGURE 1 is a schematic diagram of a phase sequence sensing circuit arranged in accordance with the principles of the present invention.

Specifically, in FIGURE 1 there is shown a circuit 10 arranged to measure the phase sequence of two phase voltages applied to input terminals A and B respectively in accordance with the principles of the invention. The phase voltages are cyclical and sinusoidal in nature such as may be provided in aircraft power systems though the invention is not limited thereto. If the phases are in correct sequence (A and B), phase A voltage will appear on a half-wave rectifying diode 11, electrically connected to terminal A, before phase B voltage appears on a half-wave rectifying diode 12 in series connection with terminal B. That is, the maximum swing or peak of voltage B will be applied across diode 12 120 degrees later than the peak potential of voltage A across diode 11.

Half-wave rectifiers 11 and 12 are connected to produce positive voltages with the positive half cycle swing of the applied phase voltage through respective current limiting resistors 13 and 14. Only two phases are required to obtain phase sequence sensing in the basic circuit shown in FIGURE 1, and it will sense all proper phase sequences which are ABC, BCA and CAB in a three-phase system. It will not provide a signal (an output signal shows proper sequence) for incorrect sequences which are ACB, CBA and BAC.

With the phase voltages in proper sequence (A first), a gate signal is first applied to a controlled rectifier 16, the anode of which is electrically connected to the output of diode 12 with the gate terminal clamped to ground through resistor 17. When phase B voltage starts its positive swing (120 degrees after phase A started its positive swing) and diode 12 applies its output voltage to the anode of rectifier 16, rectifier 16 starts conducting through cathode resistor 18 connected to ground.

Figure 5:
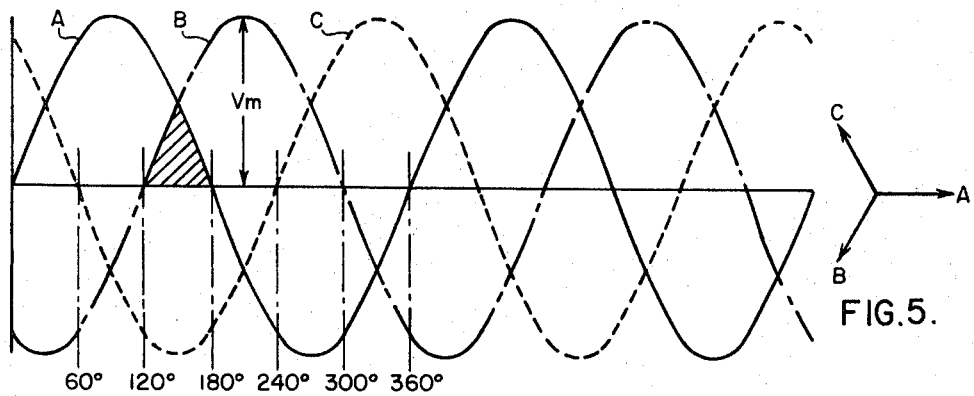
FIG. 5 shows a typical three phase alternating current voltage waveform and vector pattern.

Once a controlled rectifier starts conducting it remains conducting until the anode current is removed even though the gate signal may have been removed immediately. In the present case the gate signal is discontinued when phase A voltage starts its negative swing which is 60 degrees after phase B voltage starts its positive swing, see FIGURE 5. Therefore, with proper phase sequence, controlled rectifier 16 will conduct the full 180 degrees positive half cycle of phase B voltage, after which it will cut-off and await a gate signal from phase A diode 11 again.

A capacitor 20, connected between the cathode of rectifier 16 and ground, is charged during the conducting cycle of controlled rectifier 16. The magnitude of the voltage across capacitor 20 is proportional to the conducting angle (in electrical degrees) of rectifier 16. Capacitor 20 discharges through a diode 22, a current limiting resistor 24 and a transistor 26 when its charge voltage is above a predetermined magnitude. The voltage across capacitor 20 is applied to the base of transistor 26 causing it to conduct thereby closing a relay 30 by the flow of current through its actuating coil 28 from B+ to ground via transistor 26.

The purpose of diode 22 and resistor 24 is to raise the voltage level required to turn on transistor 26. If the amount of charge in capacitor 20 is below the "sensing level" as would be the case with an incorrect phase sequence, transistor 26 will not conduct to actuate relay 30.

Though the present circuit is particularly useful in aircraft systems which ordinarily use power frequencies of 400 c.p.s., circuit 10 can be quickly and easily changed to operate on other frequencies by simply changing the value of capacitor 20.

For purposes of illustration, switching transistor 26 is shown operating a mechanical relay. However, the output of transistor 26 may be employed to operate logic circuitry such as commercially available solid state flip-flop blocks and permanent memory devices or shift registers such as shown in application Ser. No. 428,910, filed Jan. 29, 1965 by Otto L. Apfelbeck and assigned to the present assignee, and now U.S. Patent 3,398,366 issued Aug. 20, 1968.

As presently shown in FIGURE 1, phase leads A and B are connected in proper sequence. If, however, leads A and B become interchanged the sequence would be improper as it would be a BAC sequence. Phase A voltage, arriving from the main system, would then apply its positive potential through rectifying diode 12 instead of diode 11. Thus controlled rectifier 16 would first have a positive potential applied to its anode. Controlled rectifier 16 does not, however, conduct until a gate signal is applied, and this will occur when phase B goes positive. Phase B goes positive 120 degrees after phase A goes positive (see FIG. 5) so that controlled rectifier 16 would receive its gate signal and conduct 120 degrees after it receives its anode potential. Its anode potential is present only for 180 degrees of the phase A cycle so that 60 electrical degrees after the controlled rectifier receives its gate signal, its anode signal is removed whereupon it ceases to conduct.

In other words, with an improper sequence of BAC, controlled rectifier 16 conducts for a time period of 60 degrees in contrast to the 180 degrees conduction period for the correct phase sequence described earlier. Thus, capacitor 20 has an opportunity to charge only for the 60 degree period in comparison to the 180 degree period provided by a proper phase sequence. With the relatively short charging time the charge on capacitor 20 does not reach the sensing level; that is, it does not reach the voltage magnitude necessary to overcome the impedance offered by diode 22 and resistor 24 to thereby turn on transistor 26; with no current flow through transistor 26, no relay 30 actuation is possible. Circuit 10 in FIGURE 1 can thus function to prevent main system feeder relays from closing thereby preventing wrong phase voltages from being applied to loads supplied by the power system.

The average capacitor voltage can be expressed as follows for a correct phase sequence:

$$Vc = \frac{KVm}{2\pi}\int_{0°}^{180°} \sin \alpha \, d\alpha = \frac{KVm}{2\pi}[-\cos]_{0°}^{180°} = \frac{K2Vm}{2\pi}$$

where Vc is correct phase voltage, K is a voltage divider constant, 2 represents one complete cycle and Vm is maximum (peak) voltage. The average charging voltage for an incorrect sequence (Vnc) can be expressed:

$$Vnc = \frac{KVm}{2\pi}\int_{120°}^{180°} \sin \alpha \, d\alpha = \frac{KVm}{2\pi}[-\cos]_{120°}^{180°}$$

$$Vnc = \frac{KVm}{2\pi}(-1.+.5) = \frac{.5KVm}{2\pi}$$

The ratio of Vc to Vnc is equal to $$\frac{\frac{2KVm}{2\pi}}{\frac{.5KVm}{2\pi}} = 4$$

This is the voltage ratio across capacitor 20 for correct and incorrect phase sequence. Obviously, the integrating time of circuit 10 makes the difference between correct and incorrect sequence of phase voltages. Correct phase voltages allow capacitor 20 to charge to a voltage level that is four times as great as that of incorrect phase voltages. This can be easily seen in reference to FIGURE 5;

with a gate first applied to controlled rectifier 16 (proper sequence) all the area under the positive cycle of phase B voltage is effectively integrated by capacitor 20. However, with a gate signal applied to rectifier 16 after the anode voltage is applied (improper sequence) only that area (hatched) under the overlapping curves of A and B is integrated. The hatched area is substantially one-fourth of that under the full half cycle of the phase voltage curve.

Figure 2:
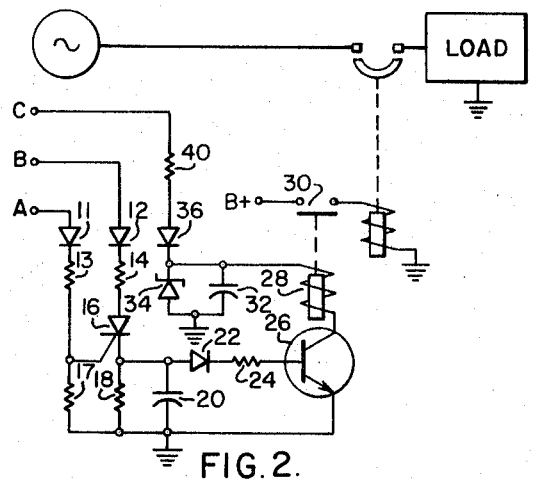
FIG. 2 is a modified form of the circuit shown in FIG. 1.

With the circuit shown in FIGURE 1, phase C could be shorted or open without affecting the operation of the circuit. That is, circuit 10 would produce an output signal as long as phases A and B are present and in correct sequence. FIGURE 2 is a modification of circuit 10 that will prevent the circiut from producing an output if any of the three phases is disconnected, regardless of phase sequences, but will work as the circuit of FIGURE 1 when all three phases are present.

In the circuit depicted in FIGURE 2, transistor 26 is connected to receive the phase C voltage on its collector in place of the B+ potential applied thereto in FIGURE 1. Relay solenoid 28 is connected in series between a half-wave rectifying diode 36 and the collector of transistor 26. A resistor 40 serves in a current limiting capacity. With a correct phase sequence, capacitor 20 produces a voltage that appears on the base of transistor 26 causing it to conduct. When phase C voltage appears, a conductive path to ground is provided by transistor 26 for the phase C current so that relay operating winding 28 is energized to effect the closing of the contacts of relay 30.

With no phase C voltage available, no current flow is possible through relay winding 28 even though transistor 26 is conducting. With phase C voltage available and applied in an incorrect sequence, no signal is available to turn on transistor 26. Therefore, again, relay winding 28 is not energized since no return path is provided through the transistor. Should phase A or B or both be open or grounded, of course no signal would be produced to turn on the transistor. Thus, with any of the three phase voltages missing, or with an improper sequence of phases, no output signal is produced by the circuit of FIGURE 2.

Capacitor 32 in FIG. 2 is a filter for the rectified voltage provided by diode 36. The capacitance value of the capacitor is chosen so as to provide a high level of direct current voltage to keep relay coil 28 energized. A Zener diode 34, connected across the capacitor, is provided to clamp the voltage across transistor 26 at a predetermined low level (say 20 volts) for the purpose of protecting the transistor from high voltage spikes and current surges.

Figure 3:
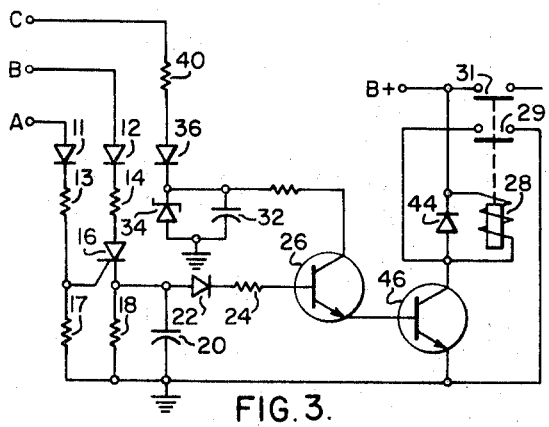
FIG. 3 is a modified form of the circuit shown in FIG. 2.

FIGURE 3 shows a modification of FIGURE 2 that provides a "lock-in" feature designed to maintain energization of the system feeder relays even if one or all of the phases become disconnected or grounded. In such a case, fuses and other types of protection means provide the necessary protection once the circuit of FIGURE 3 senses the presence of all phases in correct sequence and produces its relay actuating signal in response thereto.

In FIGURE 3, the base of a second transistor 46 is connected to the emitter of transistor 26 to receive its output voltage when three phase voltages are sensed in sequence. Transistor 46 will now conduct thereby providing a current path to ground from the B+ terminal through relay actuating coil 28. With current through coil 28, a set of relay contacts 29 are closed. Relay contacts 29 are connected across transistor 46 so that once the contacts close a direct path to ground is provided that keeps coil 28 energized and vice versa. Relay coil 28 can now only become deenergized by removal of the B+ voltage.

A set of relay contacts 31 are controlled by coil 28, as shown, to effect control of system breaker contacts (not shown) by the application of B+ voltage to their operating coils. The system breaker contacts, in turn, may be employed to connect a generator output to a load bus.

Diode 44 is a commutating diode connecting across coil 28.

Figure 4:
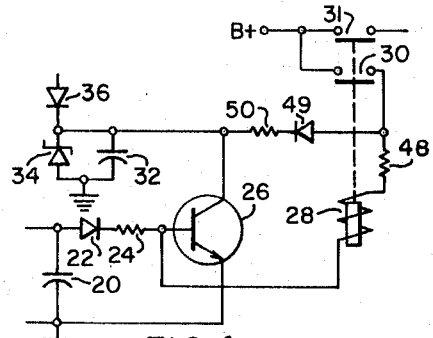
FIG. 4 shows an additional modification of the circuit shown in FIG. 2.

FIGURE 3 is one illustration of a means to keep relay 28 energized after it has been energized as explained above. FIGURE 4 shows another modification for such a purpose in which the B+ voltage is applied to the base of transistor 26 through relay contacts 30 and a voltage dropping resistor 48. B+ voltage is further applied to the collector of transistor 26 through a blocking diode 49 and a resistor 50 connected to the positive side of capacitor 32. Relay contacts 30 will not of course close until all three phases are present and sensed. After they close, B+ voltage is present on both the base of transistor 26 and on the emitter thereof through relay coil 28. Thus, should any of the phase voltages fail, the contacts 30 are locked in by B+ current flowing through coil 28 by virtue of the conductance of transistor 26 which is maintained in its on condition by the limited B+ potential applied to its base.

It should now be apparent from the foregoing description that a unique phase sequence sensing circuit has been disclosed that readily lends itself to miniaturization. Controlled rectifiers, diodes and transistors can be fabricated together in solid state unitary structures. The novel circuit described herein is suitable for such structures though the invention is not limited thereto. The circuit can use the conventional separate components. In either case, the cost, size, weight and power dissipation are minimal while the circuit can be made to operate on different frequency systems by simply changing capacitor 20. The flexibility of the circuit is further enhanced in its ability to operate relays or work compatibly with logic functions. Further, the circuit produces no signal unless all phases are present yet can be easily and quickly modified to produce the lock-in feature described above. In addition, applicant's unique circuit integrates the area under the phase voltage swings so that the larger and more critically calibrated RC components are not necessary as was the case with prior phase sequence circuits. Thus, applicant's circuit is more accurate and reliable with the use of lower cost components. All of these advantages are of particular importance in the aerospace industry where reliability, size, weight and power dissipation are of the utmost concern.

Though the invention has been described with a certain degree of particularity, it is to be understood that the disclosure herein presented has been made by way of example only and that changes may be made therein without departing from the spirit and scope of the invention.

What is claimed is:
1. A circuit for sensing phase voltages in an alternating current polyphase system comprising
   a semiconductor switching device having a control electrode,
   means for rectifying at least two of the phase voltages to provide two phase representative unidirectional voltages,
   means for applying the unidirectional voltage representing the first of the phase voltages to the control electrode of the switching device,
   means for applying the unidirectional voltage representing the second of the phase voltages across the switching device, the device becoming conductive for the period of time the second phase representative voltage is applied thereacross after the time at which the first phase representative voltage is applied to the control electrode,
   an electrical capacitor connected to the switching device to be charged by the device when it is conducting, the level of the charge being in proportion to the period of time the device is conductive, and
   a second switching device connected to the capacitor to be operated when the charge on the capacitor reaches a predetermined level.

2. The circuit of claim 1 in which the semiconducting switching device is a controlled rectifier.

3. The circuit of claim 1 in which the second switching device is a transistor, the base of which is connected to receive the charge on the capacitor.

4. The circuit of claim 3 including means for applying a third phase representative voltage to the collector electrode of the transistor.

5. The circuit of claim 3 in which the emitter of the transistor is connected to the base of a second transistor, the second transistor being connected in series with a relay actuating coil, and in parallel with a pair of contacts operated by the coil.

6. The circuit of claim 3 including means for applying a third phase representative voltage to the collector electrode of the transistor, and means for applying an additional, direct current voltage to the collector and base of the transistor when the three phase representative voltages are present and sensed.

References Cited

UNITED STATES PATENTS

| 3,123,813 | 3/1964 | Baude | 307—127 |
| 3,364,363 | 1/1968 | Iordanidis | 317—47 |

LEE T. HIX, *Primary Examiner.*

D. J. HARNISH, *Assistant Examiner.*

U.S. Cl. X.R.

307—127, 252, 48, 148.5